United States Patent
Mont et al.

(10) Patent No.: US 10,250,627 B2
(45) Date of Patent: Apr. 2, 2019

(54) REMEDIATING A SECURITY THREAT TO A NETWORK

(71) Applicant: HEWLETT PACKARD ENTERPRISE DEVELOPMENT LP, Houston, TX (US)

(72) Inventors: Marco Casassa Mont, Bristol (GB); Simon Ian Arnell, Bracknell (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 184 days.

(21) Appl. No.: 15/500,863

(22) PCT Filed: Jul. 31, 2014

(86) PCT No.: PCT/US2014/049152
§ 371 (c)(1),
(2) Date: Jan. 31, 2017

(87) PCT Pub. No.: WO2016/018369
PCT Pub. Date: Feb. 4, 2016

(65) Prior Publication Data
US 2017/0223039 A1    Aug. 3, 2017

(51) Int. Cl.
| H04L 29/06 | (2006.01) |
| G06F 21/31 | (2013.01) |
| H04L 12/24 | (2006.01) |
| H04W 12/06 | (2009.01) |
| H04L 12/717 | (2013.01) |
| H04L 12/851 | (2013.01) |

(52) U.S. Cl.
CPC .......... *H04L 63/1425* (2013.01); *G06F 21/31* (2013.01); *H04L 41/28* (2013.01);
(Continued)

(58) Field of Classification Search
CPC . H04L 63/1425; H04L 63/10; H04L 63/1466; H04L 63/1408; H04L 41/28;
(Continued)

(56) References Cited

U.S. PATENT DOCUMENTS

| 2011/0302652 A1 | 12/2011 | Westerfeld |
| 2012/0185945 A1 | 7/2012 | Andres et al. |

(Continued)

FOREIGN PATENT DOCUMENTS

| CN | 103561011 A | 2/2014 |

OTHER PUBLICATIONS

B. Lynch et al., "Software-Defined Protection," Jan. 8, 2014, pp. 1-75, Check Point Software Technologies Ltd., Available at: <checkpoint.com/sdp/check_point_spd_white_paper.pdf>.

Brennen Lynch and Anukool Lakhina, "Implement Closed-loop Network Decisioning Now with Big Data Analytics and Fuel Future-state SDN Use Cases Through a Common Platform Deployment," Apr. 22, 2014, pp. 1-16, Guavus, Inc.

(Continued)

*Primary Examiner* — Michael S McNally
(74) *Attorney, Agent, or Firm* — Hewlett Packard Enterprise Patent Department (57) ABSTRACT

Remediating a security threat to a network includes obtaining, from a network, security information about the network to determine traffic patterns of the network, identifying, based on the traffic patterns of the network, a security threat to the network, determining, from a playbook library and a workflow library, a workflow template and at least one software-defined networking (SDN) flow rule template to remediate the security threat, and deploying, via a SDN controller, a SDN flow rule based on the at least one SDN flow rule template in the network to remediate the security threat by altering a control path of the network.

12 Claims, 7 Drawing Sheets

(52) U.S. Cl.
CPC .......... *H04L 45/42* (2013.01); *H04L 47/2441* (2013.01); *H04L 63/10* (2013.01); *H04L 63/1466* (2013.01); *H04W 12/06* (2013.01); *H04L 63/1408* (2013.01)

(58) Field of Classification Search
CPC ..... H04L 45/42; H04L 47/2441; G06F 21/31; H04W 12/06
USPC .......................................................... 726/22
See application file for complete search history.

(56) References Cited

U.S. PATENT DOCUMENTS

| | | | |
|---|---|---|---|
| 2013/0283374 A1* | 10/2013 | Zisapel | ............... H04L 63/1441 726/22 |
| 2013/0298242 A1 | 11/2013 | Kumar et al. | |
| 2014/0075557 A1 | 3/2014 | Balabine et al. | |

OTHER PUBLICATIONS

International Search Report and Written Opinion, International Application No. PCT/US2014/049152, dated Apr. 22, 2015, pp. 1-9, KIPO.
Jon Oltsik, "Big Data Security Analytics, an Enterprise Primer," Mar. 2014, pp. 1-5, ICT Insights, Issue 9, Huawei Enterprise.
Marco Casassa Mont et al., "Security Analytics: Risk Analysis for an Organisation's Incident Management Process," Sep. 6, 2012, pp. 1-86, HPL-2012-206, Hewlett-Packard Development Company, L.P.

* cited by examiner

| Workflow Library | |
|---|---|
| Security Threat(s) 352 | Workflow Template(s) 354 |
| Security Threat A 352-1 | Action One Template 354-1 |
| Security Threat B 352-2 | Action Two Template 354-2 |
| Security Threat C 352-3 | Action Three Template 354-3 |
| Security Threat D 352-4 | Action Four Template 354-4 |
| Security Threat E 352-5 | Action Five Template 354-5 |

REMEDIATING A SECURITY THREAT TO A NETWORK

BACKGROUND

A network includes a number of devices, systems, and services to allow an organization to exchange data between the number of devices, systems, and services. Often, a security operations centre (SOC) monitors the network to identify security threats that impact data transmitted over the network, security performance issues with the network, and stages of incident management lifecycles of the network.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As mentioned above, a security operations centre (SOC) monitors a network to identify security threats that impact data transmitted over the network, security performance issues with the network, and stages of incident management lifecycles of the network. Often, a SOC relies on SOC analysts to perform manual processes and workflows to the identify security threats that may impact data transmitted over the network, the security performance issues with the network, or carry out the various stages of incident management lifecycles.

To minimize the security threats to the network, a SOC analyst detects emerging security threats and translates them into actionable steps. For example, the SOC analyst translates a security threat into actionable steps by blocking network traffic, deploying advanced monitoring, or patching for vulnerabilities. The manual process of a SOC analyst's role introduces many delays to remediating a security threat to a network. As a result, security threats can become prolonged.

Further, long-term evolving security threats, such as advanced persistent threats, are hard to detect and mitigate using traditional techniques such as intrusion prevention systems and security information and event management (SIEM). Such approaches have small temporal and/or spatial frames of reference and rely on limited data and analytical capabilities. As a result, a security threat may not be identified in the network.

The principles described herein include a method and a system for remediating a security threat to a network. Such a method and system includes obtaining, from a network, security information about the network to determine traffic patterns of the network, identifying, based on the traffic patterns of the network, a security threat to the network, determining, from a playbook library and a workflow library, a workflow template and at least one software-defined networking (SDN) flow rule template to remediate the security threat, and deploying, via a SDN controller, a SDN flow rule based on the at least one SDN flow rule template in the network to remediate the security threat by altering a control path of the network. Such a method reduces the lifetime of an individual security breach in the network by improving detection rates of a security threat, reduces the time to triage, and remediates the security threat. As a result, the time to detect and remediate a security threat is minimized.

In the present specification and in the appended claims, the term "network" is meant to be understood broadly as devices, systems, services, or combinations thereof for a specific customer such as an individual or an organization. In one example, the network may be for one specific customer or for a number of customers. Further, a network may be a SDN network. In one example, a SDN network includes a SDN controller, SDN flow rule templates that have matching fields, action fields, flow tables, a number of software controlled switches, routers, or wireless access points, and instructions processed by the switches, routers, and wireless access points to define the forwarding behavior of data packets. Further, the term switch can apply equally to a wide area network (WAN) router, wireless access point, or other SDN networking device. In one example, the SDN controller in the SDN network makes decisions about how network traffic is processed by instructing switches within the SDN network to define the forwarding behavior of data packets traveling across the SDN network. Further, the SDN network decouples the control and data plane enabling control functions to be defined by the end user and performed by commodity hardware. As a result, applications can be written for the network layer that provides increased intelligence for switching decisions and support for the data and applications that exist on the SDN networks. Such applications can provide finer-grained control of the SDN network in terms of, for example, quality of service and security.

In the present specification and in the appended claims, the term "security information" is meant to be understood broadly as data related to a network that represents a state of security for the network. In one example, the security information includes unstructured data, events related to the network, or combinations thereof. In one example, events may include user events, system events, vulnerability events, domain name system (DNS) events, other events, or combinations thereof. Further, unstructured data may include data, metadata, sentiments, or other data with regard to a social media service.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
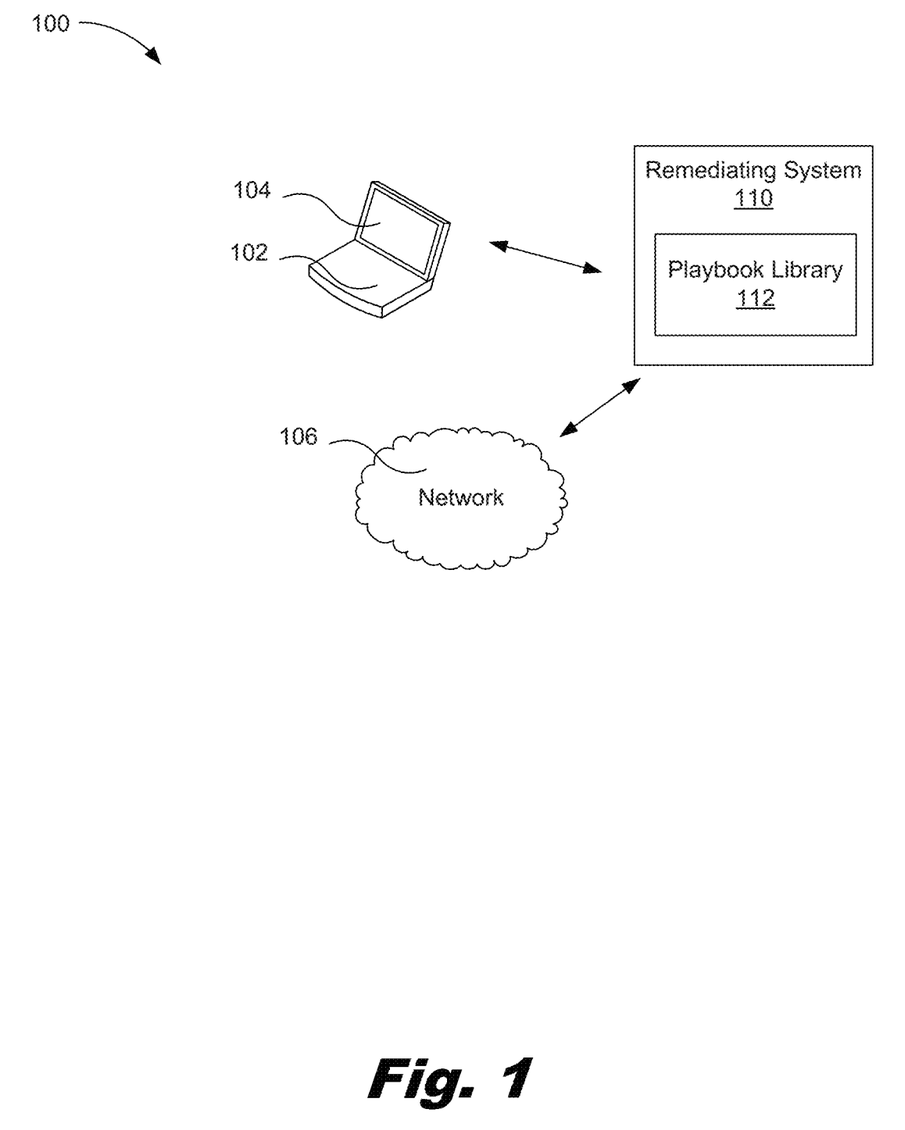
FIG. 1 is a diagram of an example of a system for remediating a security threat to a network, according to one example of principles described herein.

Referring now to the figures, FIG. 1 is a diagram of an example of a system for remediating a security threat to a network, according to one example of principles described herein. As will be described below, a remediation system is in communication with a network to obtain, from the network, security information about the network to determine traffic patterns of the network. The remediation system identifies, based on the traffic patterns of the network, a security threat to the network. Further, the remediation system determines, from a playbook library and a workflow library, a workflow template and at least one SDN flow rule template to remediate the security threat. The remediation system further deploys, via a SDN controller, a SDN flow rule based on the at least one SDN flow rule template in the network to remediate the security threat by altering a control path of the network.

As illustrated in FIG. 1, the system (100) includes a network (106). In one example, the network (106) includes devices, systems, services, or combinations thereof for a specific customer such as an individual or an organization. Further, the network may be for one specific customer or for a number of customers. In this example, the network (106) allows a specific customer to exchange data between the number of devices, systems, and services. In one example, the network (106) may be a SDN network. As mentioned above, a SDN network includes a SDN controller, a number of switches, routers, wireless access points, and instructions are processed by the switches, routers, and wireless access points to define the forwarding behavior of data packets. Further, the term switch can apply equally to WAN router, wireless access point, or other SDN networking device. In one example, the SDN controller in the SDN network makes decisions about how network traffic is processed by instructing switches within the SDN network to define the forwarding behavior of data packets traveling across the SDN network.

The system (100) further includes a remediation system (110). In keeping with the given example, the remediation system (110) obtains, from the network (106), security information about the network (106) to determine traffic patterns of the network (106). As mentioned above, the security information may be data related to the network (106) that represents a state of security for the network (106).

The remediation system (110) identifies, based on the traffic patterns of the network (106), a security threat to the network (106). In one example, security threats may impact data transmitted over the network (106) and/or impact performance of the network (106).

Further, the remediation system (110) determines, from a playbook library (112) and a workflow library, a workflow template and at least one SDN flow rule template to remediate the security threat. In one example, once the remediation system (110) determines, from the playbook library (112) and/or the workflow library, the workflow template and/or the at least one SDN flow rule template, a user such as a SOC analyst or a manager may be alerted. As illustrated, the system (100) includes a user device (102) with a display (104). In this example, the user may be alerted by the remediation system via the user device (102).

The remediation system (110) further deploys, via a SDN controller, a SDN flow rule based on the at least one SDN flow rule template in the network (106) to remediate the security threat by altering a control path of the network (106). For example, the user may authorize the remediation system (110) to deploy the SDN flow rule based on the at least one SDN flow rule template in the network (106) to remediate the security threat. In another example, the remediation system (110) may further deploy a workflow based on the workflow template. As a result, the remediation system (110) reduces the lifetime of an individual security breach in the network by improving detection rates of a security threat, reduces the time to triage, and remediates the security threat. More information about the remediation system (110) will be described later on in this specification.

While this example has been described with reference to the remediation system being located over the network, the remediation system may be located in any appropriate location according to the principles described herein. For example, the remediation system may be located in a user device, a server, a datacenter, a network, other locations, or combinations thereof.

Figure 2:
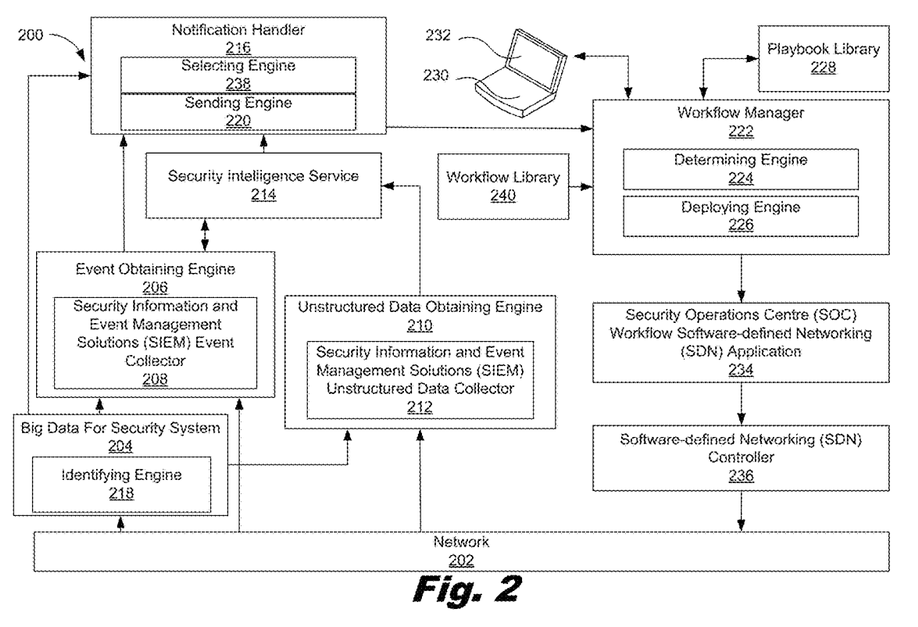
FIG. 2 is a diagram of an example of a system for remediating a security threat to a network system, according to one example of principles described herein.

FIG. 2 is a diagram of an example of system for remediating a security threat to a network system, according to one example of principles described herein. As mentioned above, a remediation system is in communication with a network to obtain, from a network, security information about the network to determine traffic patterns of the network. The remediation system identifies, based on the traffic patterns of the network, a security threat to the network. Further, the remediation system determines, from a playbook library and a workflow library, a workflow template and at least one SDN flow rule template to remediate the security threat. The remediation system further deploys, via a SDN controller, a SDN flow rule based on the at least one SDN flow rule template in the network to remediate the security threat by altering a control path of the network.

As will be described below, the system (200) includes a number of engines (206, 210, 218, 220, 224, 226, 238). The engines (206, 210, 218, 220, 224, 226, 238) refer to a combination of hardware and program instructions to perform a designated function. Each of the engines (206, 210, 218, 220, 224, 226, 238) may include a processor and memory. The program instructions are stored in the memory and cause the processor to execute the designated function of the engine.

As illustrated in FIG. 2, the system (200) includes a network (202). As mentioned above, the network (202) includes devices, systems, services, or combinations thereof for a specific customer such as an individual or an organization. Further, the network may be for one specific customer or for a number of customers. In this example, the network (202) allows a specific customer to exchange data between the number of devices, systems, and services. In one example, the devices may include user devices such as laptops, desktops, tablets, and other user devices. Further, systems may include servers, routers, networking cables, and other systems. The services may include applications that allow the devices and systems to operate within the network (202). In one example, the services may include third party services. Further, the network (202) may be a SDN network.

The system (200) further includes a big data for security system (204). In one example, the big data for security system (204) may be a system that collects data sets of security information regarding the network (202). In one example, the data set collected by the big data for security system (204) may include transient network traffic of the network (202). In one example, the data set collected by the big data for security system (204) may be sent to a notification handler (216), an event obtaining engine (206), an unstructured data obtaining engine (210), or combinations thereof.

In one example, the system (200) includes an identifying engine (218). In this example, the identifying engine (218) may be included in the big data for security system (204). The identifying engine (218) identifies, based on the traffic patterns of the network (202), a security threat to the network (202). In one example, security threats may impact data transmitted over the network (202) and/or performance of the network (202). In one example, this may be accomplished via a big data for security system (204). Further, the identifying engine (218) may be used to decide which security threat to act on. For example, based on type of security threat or the severity of the security threat the identifying engine (218) may or may not send the security threat to the notification handler (216).

As mentioned above, the system (200) obtains, from the network (202), security information about the network (202) to determine traffic patterns of the network (202). As mentioned above, the security information may be data related to the network (202) that represents a state of security for the network (202). In this example, the security information may be obtained from the big data for security system (204) by the event obtaining engine (206). In another example, the security information may be obtained from the network directly by the event obtaining engine (206).

In one example, the event obtaining engine (206) includes a SIEM event collector (208). In one example, the SIEM event collector (208) actively receives network based security logs and events from the network (202) and/or the big data for security system (204). In one example, events may include user events, system events, vulnerability events, DNS events, other events, or combinations thereof. In one example, the SIEM event collector (208) may include analytics to aid the system in identify traffic patterns of the network (202). In one example, traffic patterns may be identified by trend analysis, computation of a set of threat indicators, anomaly detection based on historical data, or combinations thereof. Further, the system (200) may focus on identifying traffic patterns via DNS network interactions. As, a result, the event obtaining engine (206) may be used to obtain, from the network (202), security information about the network (202) to determine the traffic patterns of the network (202).

In another example, an unstructured data obtaining engine (210) may be used to obtain, from the network (202), security information about the network (202) to determine traffic patterns of the network (202). In this example, the unstructured data obtaining engine (210) may include a SIEM unstructured data collector (212) to obtain, from the network (202), security information about the network (202) to determine traffic patterns of the network (202). In this example, the SIEM unstructured data collector (212) may obtain unstructured data such as sentiments from users uploading data to a social media service on the network (202). In one example, the SIEM unstructured data collector (212) may include analytics to aid the system (200) in identify traffic patterns of the network (202) with regard to unstructured data. As, a result, the unstructured data obtaining engine (210) may be used to obtain, from the network (202), security information about the network (202) to determine the traffic patterns of the network (202). In one example, the SIEM event collector (208) and the unstructured data collector (212) may be used to further identify the security threats.

Once the security information is obtained via the event obtaining engine (206) or the unstructured data obtaining engine (210), the security information and/or security threats may be further processed by a security intelligence service (214) as illustrated in FIG. 2. In this example, the security intelligence service (214) may be a third party application that processes events and unstructured data obtained by the event obtaining engine (206) or the unstructured data obtaining engine (210). In one example, the security intelligence service (214) may be used to further identify the security threats.

As illustrated in FIG. 2, once the security information from the network (202) is obtained to determine the traffic patterns of the network (202), the security information and/or security threats is sent to the notification handler (216). As illustrated, the notification handler (216) includes selecting engine (238) and a sending engine (220).

In one example, the selecting engine (238) selects the security threats identified by the identifying engine (218), the SIEM event collector (208), the SIEM unstructured data collector (212), and the security intelligence service (214). For example, if the identifying engine (218), the SIEM event collector (208), the SIEM unstructured data collector (212), and the security intelligence service (214) identifies security threat A, security threat B, security threat C, and security threat D, the selecting engine (238) selects, for example, security threat A. In this example, the selecting engine (238) selects security threat A because security threat A poses the most severe threat to the network (202). Once the security threat is selected, a sending engine (220) sends the security threat to a workflow manager (222).

In one example, the sending engine (220) sends an alert to notify a user regarding the security threat to the network (202). In one example, the sending engine (220) sends the alert to the workflow manager (222). As will be described below, the workflow manager (222) is driven by a workflow library (240), a user device (230), and a playbook library (228).

As illustrated, the work flow manager (222) includes a determining engine (224) and a deploying engine (226). In one example, the determining engine (224) determines, from a playbook library (228), at least one SDN flow rule template to remediate the security threat. In one example, the playbook library (228) may include a quarantine flow rule template, an interdict flow rule template, a block flow rule template, a decoy flow rule template, an obfuscate flow rule template, other flow rule templates, or combinations thereof.

In one example, once the determining engine (224) determines, from the playbook library (228), the at least one SDN flow rule template. Further, a user such as a SOC analyst or a manager may be alerted via the sending engine (220). As illustrated, the system (200) includes a user device (230) with a display (232). In this example, the user may be alerted by the remediation system via the user device (230).

In another example, the determining engine (224) determines, from a workflow library (240), a workflow template. In one example, the workflow library (240) may include a number of actions to aid in remediating the security threat. As will be described below, the actions may include notifying a specific user, sending and/or receiving authorization from a specific user, executing a SDN flow rule template, other actions beyond SDN applications, other actions, or combinations thereof.

In one example, once the determining engine (224) determines, from the workflow library (240), a workflow template, a user such as a SOC analyst or a manager may be alerted via, for example, the sending engine (220). As illustrated, the system (200) includes the user device (230) with the display (232). In this example, the user may be alerted by the system (200) via the user device (230).

As will be described in other parts of this specification, the determining engine (224) determines, from the playbook library (228) and the workflow library (240), a workflow template and at least one SDN flow rule template by presenting a number of workflow templates from the workflow library (240) and a number of SDN flow rule templates from the playbook library (228) to a user. In one example, the number of workflow templates from the workflow library (240) and the number of SDN flow rule templates from the playbook library (228) may be presented to the user via a display (232) of a user device (230).

Further, the determining engine (224) determines, from the playbook library (228) and the workflow library (240), the workflow template and the at least one SDN flow rule template by receiving a selection from the user. In one example, the selection includes the workflow template and the at least one SDN flow rule template. In keeping with the given example, the user may make the selection via the display (232) of the user device (230). For example, the display (232) of the user device (230) may display a user interface that allows the user to select SDN flow rule templates and workflow templates.

Further, the determining engine (224) determines, from the playbook library (228) and the workflow library (240), the workflow template and the at least one SDN flow rule template by advancing, based upon the selection of the user, a workflow based on the workflow template by adding a SDN flow rule based on the at least one SDN flow rule template to a flow table of the network. For example, if the user selects workflow template A and a decoy SDN flow rule template, a workflow based on workflow template A is advanced by adding a SDN flow rule based on the decoy SDN flow rule template to a flow table of the network (202).

As mentioned above, the workflow manager (222) includes a deploying engine (226). The deploying engine (226) deploys, via a SDN controller (236), a SDN flow rule based on the at least one SDN flow rule template in the network (202) to remediate the security threat by altering a control path of the network (202). For example, the user may authorize the deploying engine (226) to deploy a SDN flow rule based on the at least one SDN flow rule template in a SOC SDN application (236) and a SDN controller (236). As a result, the control path of the network (202) may be altered according to the at least one SDN flow rule template.

In another example, the deploying engine (226) deploys, via the SDN controller (236), a workflow based on a workflow template. As mentioned above, the workflow template may include a number of actions to remediate the security threat. As a result, the workflow manager (222), the playbook library (228), the workflow library (240), the SOC workflow SDN application (234), and the SDN controller (236) may be used to remediate the security threat.

While this example has been described with reference to the system (200) including the event obtaining engine (206), the unstructured data obtaining engine (210), and the big data for security system (204), the system (200) may include other obtaining engines, or combinations thereof. For example, the system (200) includes the big data for security system (204). In another example, the system (200) includes the big data for security system (204) and the unstructured data obtaining engine (210).

An overall example will now be described with reference to FIG. 2. As mentioned above, the system (200) obtains, from the network (202), security information about the network (202) to determine traffic patterns of the network (202). As mentioned above, this may be accomplished via the big data for security system (204), the event obtaining engine (206), the unstructured data obtaining engine (210), the security intelligence service (214), or combinations thereof.

Further, the system (200) identifies, based on the traffic patterns of the network (202), security threats to the network (202). In one example, this may be accomplished via the identifying engine (218). Further, the event obtaining engine (206), the unstructured data obtaining engine (210), the security intelligence service (214), or combinations thereof may further identify, based on the traffic patterns of the network (202), security threats to the network (202). In this example, security threat A, security threat B, and security threat C are identified.

In this example, the security threats are sent to the notification handler (216). The selecting engine (238) selects security threat A based on security threat A's type. Further, the sending engine (220) sends an alert to notify a user regarding security threat A to the network (202). In one example, security threat A is sent to the workflow manager (222).

The determining engine (224) of the workflow manager (222) determines, from the playbook library (224) and the workflow library (240), a workflow template and at least one SDN flow rule template to remediate the security threat A. In one example, the workflow template is an action, such as an authorization to deploy the SDN flow rule. As mentioned above, a user may make a selection, from presented workflow templates and SDN flow rule templates, a workflow template and a SDN flow rule template that may best remediate the security threat. Once the selection is made, a workflow based on the workflow template is advanced by adding a SDN flow rule based on the SDN flow rule template to a flow table of the network (202). Further, the deploying engine (226) deploys the SDN flow rule based on the at least one SDN flow rule template in the network (226) to remediate security threat A by altering a control path of the network (202). In one example, the control path of the network (202) may be altered via the SOC workflow SDN application (234) and the SDN controller (236). In another example, the SDN controller (236) may be controlled by a different entity than the SOC workflow SDN application (234).

Figure 3A:
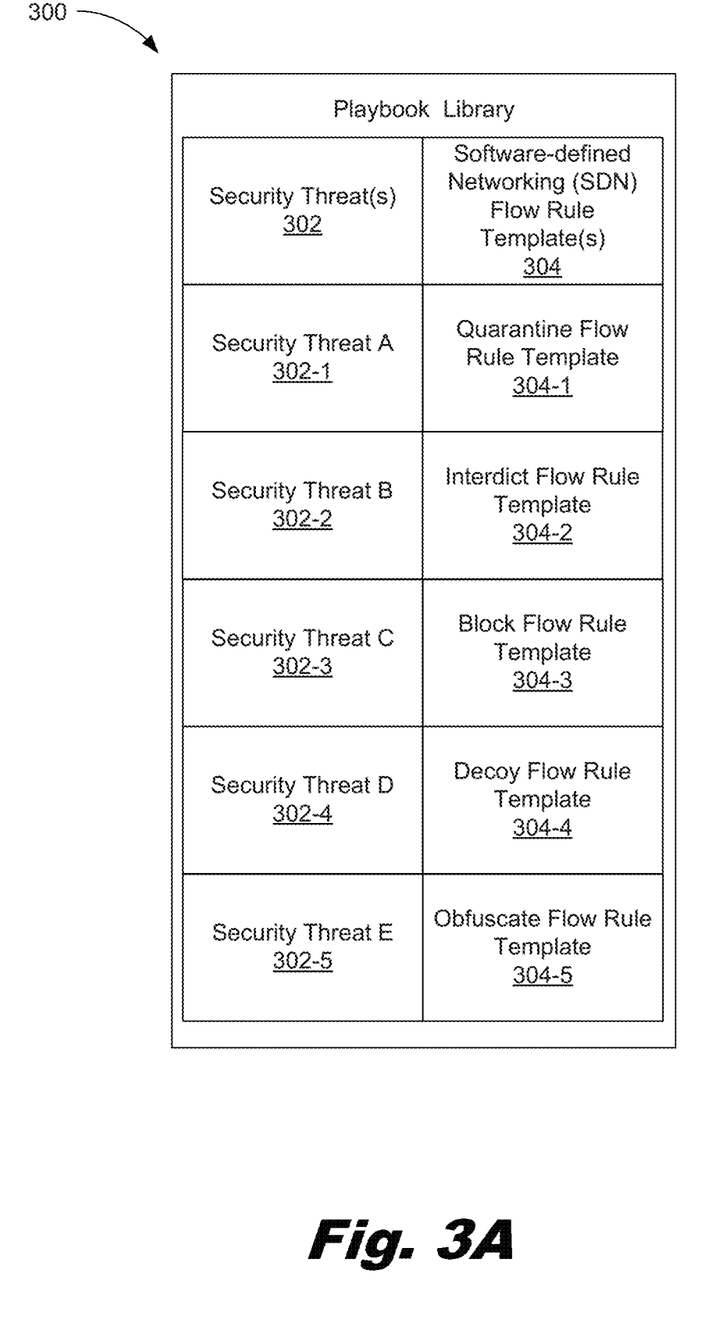
FIG. 3A is a diagram of an example of a playbook library, according to one example of principles described herein.

FIG. 3A is a diagram of an example of a playbook library, according to one example of principles described herein. As mentioned above, the remediation system of FIG. 1 determines, from a playbook library, at least one SDN flow rule template to remediate the security threat. The remediation system further deploys, via a SDN controller, a SDN flow rule based on the at least one SDN flow rule template in the network to remediate the security threat by altering a control path of the network.

As illustrated in FIG. 3A, the playbook library (300) includes a number of security threats (302). In this example, the playbook library (300) includes security threat A (302-

1), security threat B (302-2), security threat C (302-3), security threat D (302-4), and security threat E (302-5).

In one example, security threat A (302-1) may be a source device that threatens the network. Security threat B (302-2) may be a security threat that threatens the traffic flow of the network. Security threat C (302-3) may be a security threat that allows an attacker, such as an individual or organization, which is not allowed to access the network or transmit data packets via the network. Security threat D (302-4) may be a security threat where an attacker is attempting to access valuable assets. Security threat E (302-5) may be a security threat where an attacker is easily accessing assets on the network.

As illustrated in FIG. 3A, the playbook library (300) includes SDN flow rule templates (304). In one example, the SDN flow rule templates (304) specify a number of specific device and/or packet information. As mentioned above, the remediation system (100) of FIG. 1 deploys, via a SDN controller, a SDN flow rule based on at least one of the SDN flow rule templates (304) in the network to remediate the security threat by altering a control path of the network. In one example, the SDN flow rule templates (304) include a quarantine flow rule template (304-1), a interdict flow rule template (304-2), a block flow rule template (304-3), a decoy flow rule template (304-4), and an obfuscate flow rule template (304-5).

In one example, the SDN flow rule templates (304) may be used to create the SDN flow rules. For example, a workflow manager instantiates a workflow template, based on a selected security threat and parameters. In one example, the parameters may include an internet protocol (IP) address of a device in the network, an electronic mail (email) address of a user, such as a SOC manager, to approve a an action of a workflow, other parameters or combinations thereof.

As mentioned above, the workflow template includes a set of actions such as asking for authorization to deploy a SDN flow rule, sending an email to a SOC manager to notify the SOC manager of a security threat, a number of SDN flow rules, other actions, or combinations thereof. Further, the workflow manager instantiates a relevant SDN flow rule template before a relevant SDN flow rule based on the relevant SDN flow rule template is deployed in the network. For example, a device may be identified as a security threat. Further, if the relevant SDN flow rule template is to block network traffic of the device, based on the device's IP address, the workflow manager instantiates the relevant SDN flow rule template by replacing a parameter of the relevant SDN flow rule template with the device's IP address. The workflow manager then proceeds as described above to remediate the security threat by deploying, via a SDN controller, the SDN flow rule based on the at least one SDN flow rule template in the network to remediate the security threat by altering a control path of the network.

Further, instantiation of SDN flow rule templates may be outsourced to an SDN controller if the SDN controller has relevant information. In one example, this includes a late binding of parameters based on local knowledge that the SDN controller has. In another example, a workflow manager may receive the relevant information from the SDN controller. As a result, the instantiation of SDN flow rule templates may be done in whole or in part via the workflow manager and/or the SDN controller.

As mentioned above, the playbook library (300) includes a quarantine flow rule template (304-1). In one example, the quarantine flow rule template (304-1) prohibits data packets from reaching a destination within the network. For example, the quarantine flow rule template (304-1) isolates source devices into a separate logical network sandbox such as a virtual local area network (VLAN) where their traffic can go through. In this example, the quarantine flow rule template (304-1) overrides standard network functions such as VLAN tagging operations and switching decisions made with the VLAN tagging operations. This results in an isolation mechanism to prohibit data packets from reaching a destination within the network. In one example, the quarantine flow rule template (304-1) increases logging verbosity allowing for a full analysis of semantics requested by a targeted service in the network. Further, the quarantine flow rule template (304-1) may be used for deeper inspection using hardware such as DNS capture devices to employ within the big data for security system of FIG. 2. In this example, if the traffic on the network is not safe, a SDN flow rule based on the quarantine flow rule template (304-1) is deployed to drop data packets matching the flow rule template match criteria. Further, a ticket may be raised with a forensics team of the network when the SDN flow rule based on the quarantine flow rule template (304-1) is deployed. As a result, if the security threat to the network is security threat A (302-1) or the security threat is very similar to security threat A (302-1), the SDN flow rule based on the quarantine flow rule template (304-1) may be deployed on the network to remediate the security threat by altering a control path of the network.

In one example, the interdict flow rule template (304-2) identifies a flow of traffic in the network. In this example, the interdict flow rule template (304-2) aids with an investigation of the flow of traffic on the network. In this example, the interdict flow rule template (304-2) may freeze the infrastructure topology of the network. In one example, the interdict flow rule template (304-2) updates a flow table with a change to a quality of service class to allow a SOC user to specify a minimum and maximum allowed bandwidth per defined flow. In one example, specifying a minimum and maximum allowed bandwidth per defined flow enables a SOC user to slow the network traffic by coupling this with mirroring traffic to a second port. Further, traditional network forensics is allowed to take place without interruption to the network or utilization of contested switch port analyzer (SPAN). Further, the interdict flow rule template (304-2) freezes the infrastructure topology of the network by slowing down the network via altering quality of service classes. As a result, if the security threat to the network is security threat B (302-2) or the security threat is very similar to security threat B (302-2), a SDN flow rule based on the interdict flow rule template (304-2) may be deployed on the network to remediate the security threat by altering a control path of the network.

In one example, the block flow rule template (304-3) drops packets matching specific criteria. In one example, the specific criteria may match a specific traffic pattern of security threat C (302-3). The block flow rule template (304-3) may closely resemble traditional intrusion prevention system (IPS) functionality. As a result, if the security threat to the network is security threat C (302-3) or the security threat is very similar to security threat C (302-3), a SDN flow rule based on the block flow rule template (304-3) may be deployed on the network to remediate the security threat by altering a control path of the network.

In one example, the decoy flow rule template (304-4) distracts an attack on assets. The decoy flow rule template (304-4) creates an arbitrarily sized network of highly attractive and vulnerable virtual machines (VM) with a pseudo-randomized structure in an effort to distract the attacker from more valuable assets. In one example, the decoy flow rule template (304-4) may be a combination of SDN and orchestration. For example, an orchestration request may be deployed by a network orchestration system separate from, but in communication with, the SDN controller to create a new network such as templated honey-net VMs. Further, the flow table may be overridden to redirect request from the original host to this new network. In this example, the decoy flow rule template (304-4) may be similar to a honey-net. As a result, if the security threat to the network is security threat D (302-4) or the security threat is very similar to security threat D (302-4), a SDN flow rule based on the decoy flow rule template (304-4) may be deployed on the network to remediate the security threat by altering a control path of the network.

In one example, the obfuscate flow rule template (304-5) identifies a specific application and redeploys the specific application's underlying infrastructure with a non-deterministic design. In one example, the obfuscate flow rule template (304-5) is similar to the decoy flow rule template (304-4). For example, the obfuscate flow rule template (304-5) may be a combination of SDN and orchestration to identify the specific application and redeploy the specific application's underlying infrastructure with a non-deterministic design. In one example, the obfuscate flow rule template (304-5) may include several SDN flow rules that are deployed at multiple network devices. For example, the obfuscate flow rule template (304-5) identifies a target application and redeploys the target application's underlying infrastructure with a non-deterministic configuration from the attacker's perspective. As a result, the obfuscate flow rule template (304-5) invalidates the attacker's reconnaissance which slows down the attacker's attacks. This can result in increased costs to the attacker thereby making the attacks unattractive. As a result, if the security threat to the network is security threat E (302-5) or the security threat is very similar to security threat E (302-5), a SDN flow rule based on the obfuscate flow rule template (304-5) may be deployed on the network to remediate the security threat by altering a control path of the network.

While this example has been described with reference to one SDN flow rule template associated a security threat, the playbook may associate several SDN flow rule templates to a security threat. For example, a quarantine flow rule template and a block flow rule template may be associated with security threat A.

Figure 3B:
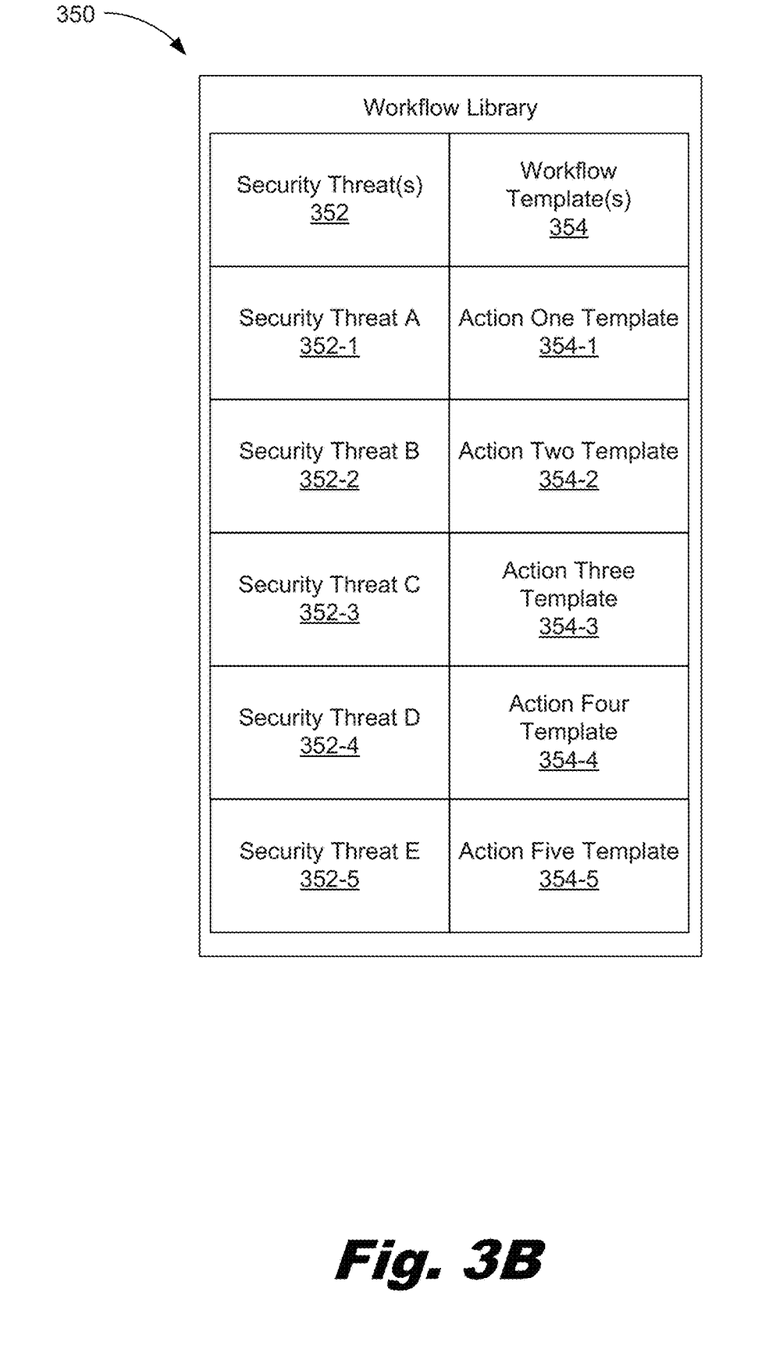
FIG. 3B is a diagram of an example of a workflow library, according to one example of principles described herein.

FIG. 3B is a diagram of an example of a workflow library, according to one example of principles described herein. As mentioned above, the remediation system of FIG. 1 determines, from a workflow library, a workflow template to remediate the security threat and/or alerts a user to take action. The remediation system may deploy, via a SDN controller, a workflow based on the workflow template to remediate the security threat by altering a control path of the network and/or alert a user to take action.

As illustrated in FIG. 3B, the workflow library (350) includes a number of security threats (352). In this example, the workflow library (350) includes security threat A (352-1), security threat B (352-2), security threat C (352-3), security threat D (352-4), and security threat E (352-5).

In one example, security threat A (352-1) may be a source device that threatens the network. Security threat B (352-2) may be a security threat that threatens the traffic flow of the network. Security threat C (352-3) may be a security threat that allows an attacker, such as an individual or organization not allowed to access the network, to transmit data packets via the network. Security threat D (352-4) may be a security threat where an attacker is attempting to access valuable assets. Security threat E (352-5) may be a security threat where an attacker is easily accessing assets on the network.

As illustrated in FIG. 3B, the workflow library (350) includes workflow templates (354). In this example, the workflow library (350) includes workflow templates (354) such as action one template (354-1), action two template (354-2), action three template (354-3), action four template (354-4), and action five template (354-5).

In one example, action one template (354-1) may be a workflow template that notifies a specific user with regard to security threat A (352-1). For example, action one (354-1) notifies user A that a source device threatens the network.

In one example, action two template (354-2) may be workflow template that needs specific authorization from a specific user to remediate security threat B (352-2). For example, action two template (354-2) needs authorization from a user such as a SCO manager before remediating security threat B (352-2).

In one example, action three template (354-3) may be used to gather more context for users. For example, if security threat three (352-3) is identified, action three template (354-3) may be used to gather more context for the users regarding security threat three (352-3).

In one example, action four template (354-4) may be used to execute a number of SDN flow rule templates from a playbook library. For example, action four template (354-4) may execute an obfuscate flow rule template and/or a decoy flow rule template.

In one example, action five template (354-5) may be any other action beyond a SDN realm that is used to remediate a security threat (352). For example, to remediate security threat E (352-6), action five template (354-5) may be logic based to drive a workflow manager to remediate security threat E (352-6).

While this example has been described with reference to one workflow template associated a security threat, the workflow templates may associate with several security threats. For example, a notification workflow template and an authorization workflow template may be associated with security threat A.

Figure 4:
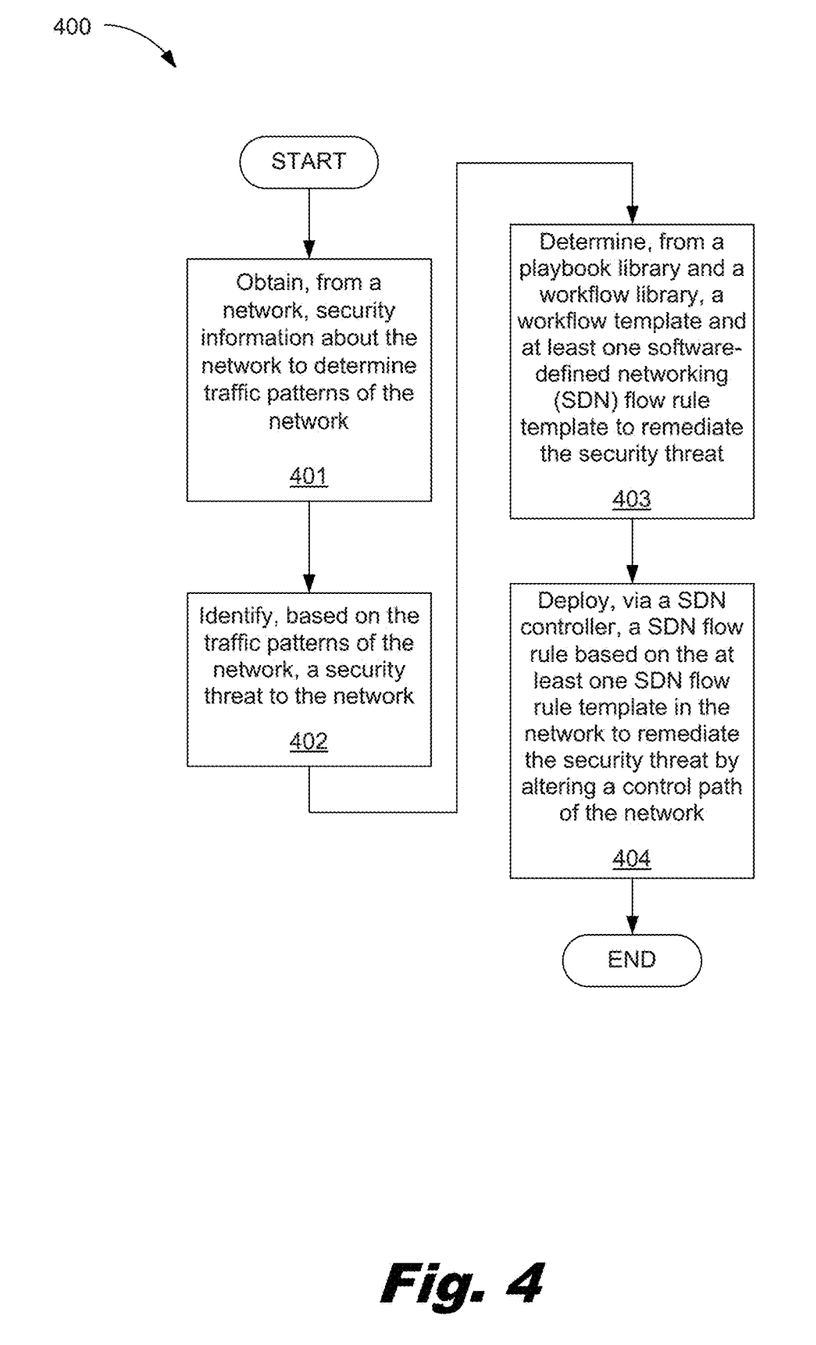
FIG. 4 is a flowchart of an example of a method for remediating a security threat to a network, according to one example of principles described herein.

FIG. 4 is a flowchart of an example of a method for remediating a security threat to a network, according to one example of principles described herein. In one example, the method (400) may be executed by the system (100) of FIG. 1. In other examples, the method (400) may be executed by other systems such as system 200, system 600, or system 700. In this example, the method (400) includes obtaining (401), from a network, security information about the network to determine traffic patterns of the network, identifying (402), based on the traffic patterns of the network, a security threat to the network, determining (403), from a playbook library and a workflow library, a workflow template and at least one SDN flow rule template to remediate the security threat, and deploying (404), via a SDN controller, a SDN flow rule based on the at least one SDN flow rule template in the network to remediate the security threat by altering a control path of the network.

As mentioned above, the method (400) includes obtaining (401), from a network, security information about the network to determine traffic patterns of the network. As mentioned above, a big data for security system may be a data set for security information regarding the network. In one example, the data set collected by the big data for security system may include events related to the network. In one example, the events may include user events, system events, vulnerability events, DNS events, other events, or combinations thereof.

In one example, the security information may be obtained by the big data for security system for the event obtaining engine of FIG. 2. In another example, the security information may be obtained from the network directly for the event obtaining engine of FIG. 2 by a SIEM collector. In yet another example, the security information may be obtained from the network directly for the unstructured data obtaining engine of FIG. 2 by a SIEM unstructured data collector.

For example, the event obtaining engine of FIG. 2 includes the SIEM event collector. In one example, the SIEM event collector actively receives network based security logs and events from the network and/or the big data for security system. In one example, the SIEM event collector may include analytics to aid the system in identify traffic patterns of the network. As, a result, the event obtaining engine may be used to obtain, from the network, security information about the network to determine the traffic patterns of the network.

Further, the unstructured data obtaining engine of FIG. 2 may be used to obtain, from the network, security information about the network to determine traffic patterns of the network. In this example, the unstructured data obtaining engine may include a SIEM unstructured data collector may to obtain, from the network, security information about the network to determine traffic patterns of the network. In this example, the SIEM unstructured data collector may obtain unstructured data such as sentiments from users uploading data to a social media service on the network. In one example, the SIEM unstructured data collector may include analytics to aid the system in identify traffic patterns of the network with regard to unstructured data. As, a result, the unstructured data obtaining engine may be used to obtain, from the network, security information about the network to determine the traffic patterns of the network.

Once the security information is obtained via the event obtaining engine or the unstructured data obtaining engine, the security information may be further processed by a security intelligence service. In this example, the security intelligence service may be a third party application that processes events and unstructured data obtained by the event obtaining engine or the unstructured data obtaining engine.

Further, once the security information is obtained the security information about the network may be analyzed to determine traffic patterns of the network. In one example, the traffic patterns may be determined by analyzing the security information to determine when and how often specific individuals or organizations access devices, systems, or services in the customer service. In this example, the traffic patterns may indicate a specific individual is accessing service A in the network. Further, the traffic patterns may indicate the specific individual accesses service A, with a user name and password, in fifteen attempts. As a result, based on the traffic patterns of the specific individual, the specific individual may be an unauthorized user.

As mentioned above, the method (400) includes identifying (402), based on the traffic patterns of the network, a security threat to the network. In one example, the identifying engine of FIG. 2 identifies, based on the traffic patterns of the network, a security threat to the network. In one example, security threats may impact data transmitted over the network, performance of the network (202), or other security threats.

In one example, identifying, based on the traffic patterns of the network, the security threat to the network includes analyzing the traffic patterns to identify the security threats based on a library of threat indicators. For example, if the predefined library of threat indicators includes security threat A, security threat B, and security threat C and the traffic pattern matches security threat A, the traffic pattern may be identified as security threat A. In another example, if the predefined library of threat indicators includes security threat A, security threat B, and security threat C and the traffic pattern matches security threat A and security threat C, the traffic pattern may be identified as security threat A and security threat C.

In keeping with the given example, the traffic patterns of the specific individual are matched against a predefined library of threat indicators. Since the traffic patterns of the specific individual indicate the specific individual may be an unauthorized user, the specific individual may be identified as a security threat.

In one example, a security threat to the network maybe identified by a number of components of FIG. 2. For example, the big data for security system, the identifying engine, the SIEM event collector, the SIEM unstructured data collector, the security intelligence service, or combinations thereof may be used to identify the security threat.

Further, a selecting engine of FIG. 2 may further be used to identify the security threat. As mentioned above, the selecting engine may filter a number of security threats to determine which of the security threats are to be remediated.

As mentioned above, the method (400) includes determining (403), from a playbook library and a workflow library, a workflow template and at least one SDN flow rule template to remediate the security threat. In one example, the determining engine of FIG. 2 determines, from a playbook library and a workflow library, a workflow template and at least one SDN flow rule template to remediate the security threat.

In one example, the playbook library may include a quarantine flow rule template, an interdict flow rule template, a block flow rule template, a decoy flow rule template, an obfuscate flow rule template, other flow rule template, or combinations thereof.

In keeping with the given example, since the specific individual is identified as a security threat, method (400) determines, from the playbook library, at least one SDN flow rule template to remediate the security threat. For example, the method may determine, from the playbook library, a block flow rule template and/or an obfuscate flow rule template may be used to remediate the security threat.

In one example, the workflow library may include a number of actions to help remediate the security threat. As mentioned above, the actions may include notifying a specific user, sending or receiving authorization from a specific user, executing a SDN flow rule template, other actions beyond SDN applications, other actions, or combinations thereof.

In one example, determining (403), from the playbook library and the workflow library, the workflow template and the at least one SDN flow rule template to remediate the security threat includes presenting a number of workflow templates from the workflow library and a number of SDN flow rule templates from the playbook library to a user. As mentioned above, if the method (400) determines a block flow rule template and an obfuscate flow rule template from the playbook may be used to remediate the security threat, the block flow rule template and the obfuscate flow rule template may be presented to the user. In this example, the block flow rule template and the obfuscate flow rule template may be presented to the user via a display of a user device. Further, if the method (400) determines a workflow template, such as a workflow template that needs authorization to deploy the SDN flow rules, is needed to further remediate the security threat, the workflow template is presented to the user as described above.

In keeping with the given example, determining (403), from the playbook library and the workflow library, the workflow template and the at least one SDN flow rule template to remediate the security threat further includes receiving a selection from the user, the selection includes the workflow template and the at least one SDN flow rule template. For example, if the user determines the block flow rule template and the workflow template may optimally remediate the security threat, the user selects the block flow rule template and the workflow template and the method (400) receives the user's selection. In this example, the user device may be used to allow the user to make the selection.

In keeping with the given example, determining (403), from the playbook library and the workflow library, the workflow template and the at least one SDN flow rule template to remediate the security threat further includes advancing, based upon the selection of the user, a workflow based on the workflow template by adding a SDN flow rule based the at least one SDN flow rule template to a flow table of the network. For example, the workflow based on the workflow template may be advanced by adding the SDN flow rule based on the block flow rule template to a flow table of the network.

As mentioned above, the method (400) includes deploying (404), via a SDN controller, a SDN flow rule based on the at least one SDN flow rule template in the network to remediate the security threat by altering a control path of the network. As mentioned above, the work flow manager of FIG. 2 includes a deploying engine. The deploying engine deploys, via a SDN controller, a SDN flow rule based on the at least one SDN flow rule template in the network to remediate the security threat by altering a control path of the network. For example, the user may authorize the deploying engine to deploy a SDN flow rule based on the at least one SDN flow rule template in a SOC SDN application and a SDN controller of FIG. 2. In this example, the SDN controller makes decisions about how network traffic is processed by instructing switches within the network to define the forwarding behavior of data packets traveling across the network based on the SDN flow rule template. As a result, the control path of the network may be altered based on the at least one SDN flow rule template.

In keeping with the given example, a SDN flow rule based on the block flow rule template is deployed, via the SDN controller, in the network to remediate the security threat by altering a control path of the network. In this example, the SDN flow rule based on the block flow rule template blocks the specific individual from accessing service A.

In another example, the method (400) deploys, via a SDN controller, a workflow based on at least one of the workflow template to remediate the security threat and/or alert a user to take action. This may include deploying one or more actions associated with the workflow library.

Figure 5:
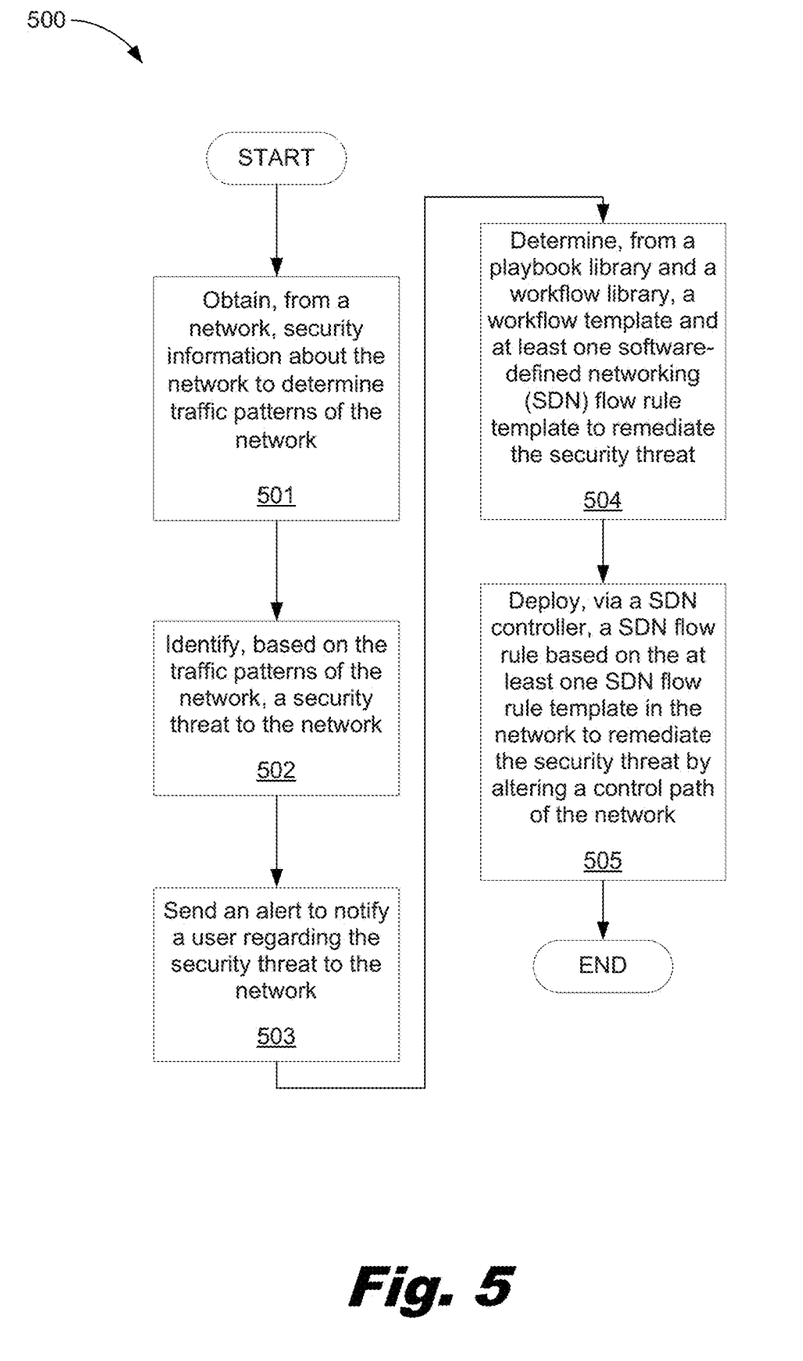
FIG. 5 is a flowchart of an example of a method for remediating a security threat to a network, according to one example of principles described herein.

FIG. 5 is a flowchart of an example of a method for remediating a security threat to a network, according to one example of principles described herein. In one example, the method (500) may be executed by the system (100) of FIG. 1. In other examples, the method (500) may be executed by other systems such as system 200, system 600, or system 700. In this example, the method (500) includes obtaining (501), from a network, security information about the network to determine traffic patterns of the network, identifying (502), based on the traffic patterns of the network, a security threat to the network, sending (503) an alert to notify a user regarding the security threat to the network, determining (504), from a playbook library and a workflow library, a workflow template and at least one SDN flow rule template to remediate the security threat, and deploying (505), via a SDN controller, a SDN flow rule based on the at least one SDN flow rule template in the network to remediate the security threat by altering a control path of the network.

As mentioned above, the method (500) includes sending (503) an alert to notify a user regarding the security threat to the network. Once the determining engine of FIG. 2 determines, from the playbook library, the at least one SDN flow rule template to remediate the security threat, a user such as a SOC analyst or a manager may be alerted via the sending engine. In this example, the user may be alerted by the remediation system of FIG. 1 via a user device.

In one example, the alert allows the user to authorize a SDN flow rule based on the least one SDN flow rule template to deploy on the network. For example, if the alert includes a SDN flow rule based on a decoy flow rule template, the user authorizes the SDN flow rule based on the decoy flow rule template to deploy on the network. As a result, the SDN flow rule based on the decoy flow rule template is deployed on the network.

Further, if the user does not authorize the SDN flow rule based on the least one SDN flow rule template to deploy on the network, a second alert may be sent to the user with a different SDN flow rule based on a different SDN flow rule template to deploy on the network. For example, if the alert included a SDN flow rule based on a decoy flow rule template and the user does not authorize the SDN flow rule based on the decoy flow rule template to deploy on the network, a second alert may be sent to the user with a SDN flow rule based on a block flow rule template to deploy on the network.

In another example, if the user does not authorize the SDN flow rule based on the least one SDN flow rule template to deploy on the network, the user may select, from the playbook library, a different SDN flow rule based on a different SDN flow rule template to deploy on the network and authorize the different SDN flow rule to deploy on the network. For example, if the alert included a SDN flow rule based on a decoy flow rule template and the user does not authorize the SDN flow rule based on the decoy flow rule template to deploy on the network, the user may select a SDN flow rule based on an interdict flow rule template to deploy on the network.

Figure 6:
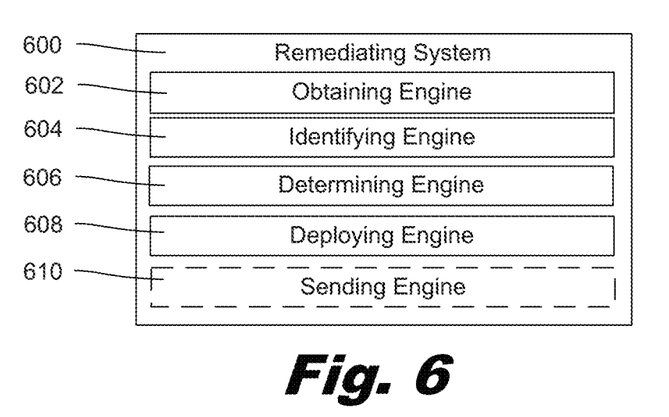
FIG. 6 is a diagram of an example of a remediating system, according to one example of principles described herein.

FIG. 6 is a diagram of an example of a remediating system, according to one example of principles described herein. The remediating system (600) includes an obtaining engine (602), an identifying engine (604), a determining engine (606), and a deploying engine (608). In this example, the remediating system (600) also includes a sending engine (610). The engines (602, 604, 606, 608, 610) refer to a combination of hardware and program instructions to perform a designated function. Each of the engines (602, 604, 606, 608, 610) may include a processor and memory. The program instructions are stored in the memory and cause the processor to execute the designated function of the engine.

The obtaining engine (602) obtains, from a network, security information about the network to determine traffic patterns of the network. In one example, the obtaining engine (602) may include the event obtaining engine of FIG. 2, the unstructured data obtaining engine of FIG. 2, the big data for security system of FIG. 2, or combinations thereof.

The identifying engine (604) identifies, based on the traffic patterns of the network, a security threat to the network. In one example, the identifying engine (604) identifies one security threat to the network. In another example, the identifying engine (604) identifies several security threats to the network.

The determining engine (606) determines, from a playbook library and a workflow library, a workflow template and at least one SDN flow rule template to remediate the security threat. In one example, the determining engine (606) determines, from the playbook library and a workflow library, one workflow template and/or one SDN flow rule template to remediate the security threat. In another example, the determining engine (606) determines, from the playbook library and a workflow library, several workflow templates and several SDN flow rule templates to remediate the security threat. In one example, the playbook library may include a quarantine flow rule template, an interdict flow rule template, a block flow rule template, a decoy flow rule template, an obfuscate flow rule template, other flow rule template, or combinations thereof. In one example, the workflow library may include a number of actions to help remediate the security threat. As mentioned above, the actions may include notifying a specific user, sending or receiving authorization from a specific user, executing a SDN flow rule template, other actions beyond SDN applications, other actions, or combinations thereof. In one example, the determining engine (606) determines, from the playbook library and the workflow library, the workflow template and the at least one SDN flow rule template to remediate the security threat by presenting a number of workflow templates from the workflow library and a number of SDN flow rule templates from the playbook library to a user. Further, the determining engine (606) determines, from the playbook library and the workflow library, the workflow template and the at least one SDN flow rule template to remediate the security threat by receiving a selection from the user, the selection includes the workflow template and the at least one SDN flow rule template. Further, the determining engine (606) determines, from the playbook library and the workflow library, the workflow template and the at least one SDN flow rule template to remediate the security threat by advancing, based upon the selection of the user, a workflow based on the workflow template by adding a SDN flow rule based on the at least one SDN flow rule template to a flow table of the network.

The deploying engine (608) deploys, via a SDN controller, a SDN flow rule based on the at least one SDN flow rule template in the network to remediate the security threat by altering a control path of the network. In one example, the deploying engine (608) deploys one SDN flow rule based on a SDN flow rule template in the network to remediate the security threat. In another example, the deploying engine (608) deploys several SDN flow rules based on several SDN flow rule templates in the network to remediate the security threat.

The sending engine (610) sends an alert to notify a user regarding the security threat to the network. In one example, the sending engine (610) sends one alert to notify a user regarding the security threat to the network. In another example, the sending engine (610) sends several alerts to notify a user regarding the security threat to the network.

Figure 7:
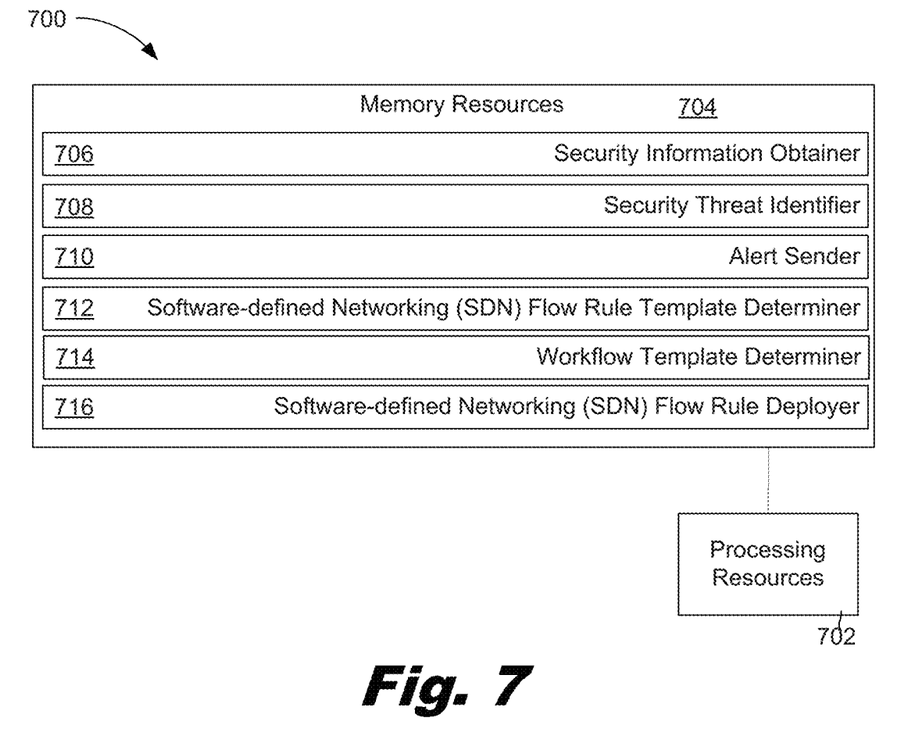
FIG. 7 is a diagram of an example of a remediating system, according to one example of principles described herein.

FIG. 7 is a diagram of an example of a remediating system (700), according to one example of principles described herein. In this example, remediating system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the remediating system (700). The programmed instructions shown stored in the memory resources (704) include a security information obtainer (706), a security threat identifier (708), an alert sender (710), a SDN flow rule template determiner (712), a workflow template determiner (714), and a SDN flow rule deployer (716).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The security information obtainer (706) represents programmed instructions that, when executed, cause the processing resources (702) to obtain, from a network, security information about the network to determine traffic patterns of the network. The security threat identifier (708) represents programmed instructions that, when executed, cause the processing resources (702) to identify, based on the traffic patterns of the network, a security threat to the network The alert sender (710) represents programmed instructions that, when executed, cause the processing resources (702) to send an alert to notify a user regarding the security threat to the network. The SDN flow rule template determiner (712) represents programmed instructions that, when executed, cause the processing resources (702) to determine, from a playbook library, at least one SDN flow rule template to remediate the security threat. The workflow template determiner (712) represents programmed instructions that, when executed, cause the processing resources (702) to determine, from a workflow library, a workflow template to remediate the security threat. The SDN flow rule deployer (716) represents programmed instructions that, when executed, cause the processing resources (702) to deploy, via a SDN controller, a SDN flow rule based on the at least one SDN flow rule template in the network to remediate the security threat by altering a control path of the network.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (702) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the remediating system (700) may be implemented on a user device, on a server, on a collection of servers, or combinations thereof.

The remediating system (700) of FIG. 7 may be part of a general purpose computer. However, in alternative examples, the remediating system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for remediating a security threat to a network, the method comprising:
   obtaining, from a network, security information about the network to determine traffic patterns of the network;
   identifying, based on the traffic patterns of the network, a security threat to the network;
   determining, from a playbook library and a workflow library, a workflow template and at least one software-defined networking (SDN) flow rule template to remediate the security threat comprising:
   presenting a number of workflow templates from the workflow library and a number of SDN flow rule templates from the playbook library to a user;
   receiving a selection from the user, the selection comprising the workflow template and the at least one SDN flow rule template; and
   advancing, based upon the selection of the user, a workflow based on the workflow template by adding the SDN flow rule based on the at least one SDN flow rule template to a flow table of the network; and
   deploying, via a SDN controller, a SDN flow rule based on the at least one SDN flow rule template in the network to remediate the security threat by altering a control path of the network.

2. The method of claim 1, in which the security information comprises unstructured data, events related to the network, or combinations thereof.

3. The method of claim 1, in which identifying, based on the traffic patterns of the network, the security threat to the network comprises analyzing the traffic patterns to identify the security threats based on a library of threat indicators.

4. The method of claim 1, in which the at least one SDN flow rule template comprises a quarantine flow rule template to prohibit data packets from reaching a destination within the network, an interdict flow rule template to freeze an infrastructure topology of the network, a block flow rule template to drop packets matching specific criteria, a decoy flow rule template to distract an attack on assets, an obfuscate flow rule template to identify a specific application and redeploy the specific application's underlying infrastructure with a non-deterministic design, or combinations thereof.

5. The method of claim 1, further comprising sending an alert to notify a user regarding the security threat to the network.

6. A system for remediating a security threat to a network, the system comprising:
   an obtaining engine to obtain, from a network, security information about the network to determine traffic patterns of the network;
   an identifying engine to identify, based on the traffic patterns of the network, a security threat to the network;
   a sending engine to send an alert to notify a user regarding the security threat to the network;
   a determining engine to determine, from a playbook library and a workflow library, a workflow template and at least one software-defined networking (SDN) flow rule template to remediate the security threat; and
   a deploying engine to deploy, via a SDN controller, a SDN flow rule based on the at least one SDN flow rule template in the network to remediate the security threat by altering a control path of the network,
   wherein the at least one SDN flow rule template comprises a quarantine flow rule template to prohibit data packets from reaching a destination within the network, an interdict flow rule template to freeze an infrastructure topology of the network, a block flow rule template to drop packets matching specific criteria, a decoy flow rule template to distract an attack on assets, an obfuscate flow rule template to identify a specific application and redeploy the specific application's underlying infrastructure with a non-deterministic design, or combinations thereof.

7. The system of claim 6, in which the security information comprises unstructured data, events related to the network, or combinations thereof.

8. The system of claim 6, in which the identifying engine identifies, based on the traffic patterns of the network, the security threat to the network by analyzing the traffic patterns to identify the security threats based on a library of threat indicators.

9. The system of claim 6, in which the determining engine determines, from the playbook library and the workflow library, the workflow template and the at least one SDN flow rule template to remediate the security threat by:
   presenting a number of workflow templates from the workflow library and a number of SDN flow rule templates from the playbook library to a user;
   receiving a selection from the user, the selection comprising the workflow template and the at least one SDN flow rule template; and
   advancing, based upon the selection of the user, a workflow based on the workflow template by adding the SDN flow rule based on the at least one SDN flow rule template to a flow table of the network.

10. A computer program product for remediating a security threat to a network, comprising:
    a tangible computer readable storage medium, said tangible computer readable storage medium comprising computer readable program code embodied therewith, said computer readable program code comprising program instructions that, when executed, causes a processor to:
    identify, based on traffic patterns of a network, a security threat to the network;
    send an alert to notify a user regarding the security threat to the network;
    determine, from a playbook library and a workflow library, a workflow template and at least one software-defined networking (SDN) flow rule template to remediate the security threat; and
    deploy, via a SDN controller, a SDN flow rule based on the at least one SDN flow rule template in the network to remediate the security threat by altering a control path of the network,
    wherein the at least one SDN flow rule template comprises a quarantine flow rule template to prohibit data packets from reaching a destination within the network, an interdict flow rule template to freeze an infrastructure topology of the network, a block flow rule template to drop packets matching specific criteria, a decoy flow rule template to distract an attack on assets, an obfuscate flow rule template to identify a specific application and redeploy the specific application's underlying infrastructure with a non-deterministic design, or combinations thereof.

11. The product of claim 10, further comprising computer readable program code comprising program instructions that, when executed, cause said processor to obtain, from the network, security information about the network to determine the traffic patterns of the network.

12. The product of claim 10, further comprising computer readable program code comprising program instructions that, when executed, cause said processor to analyze the traffic patterns to identify the security threats based on a library of threat indicators.

* * * * *